(12) United States Patent
Farhadi

(10) Patent No.: US 7,644,536 B2
(45) Date of Patent: Jan. 12, 2010

(54) SANITIZING CONTAINER AND DISPLAY

(76) Inventor: Ashkan Farhadi, 8526 Clynderven Rd., Burr Ridge, IL (US) 60527

( * ) Notice: Subject to any disclaimer, the term of this patent is extended or adjusted under 35 U.S.C. 154(b) by 387 days.

(21) Appl. No.: 11/653,552

(22) Filed: Jan. 16, 2007

(65) Prior Publication Data

US 2007/0144067 A1 Jun. 28, 2007

Related U.S. Application Data

(63) Continuation-in-part of application No. 10/857,114, filed on Jun. 1, 2004, now abandoned.

(51) Int. Cl.
*A01G 9/14* (2006.01)
(52) U.S. Cl. ............... 47/1.01 R; 47/69; 47/39
(58) Field of Classification Search ....... 47/60, 47/39, 69; 62/78
See application file for complete search history.

(56) References Cited

U.S. PATENT DOCUMENTS

| | | |
|---|---|---|
| 3,667,158 A | 6/1972 | Privett |
| 3,673,733 A | 7/1972 | Allen |
| 3,746,080 A | 7/1973 | Mallory |
| 3,973,356 A | 8/1976 | Schacht |
| 4,051,626 A | 10/1977 | Trumley |
| 4,128,966 A | 12/1978 | Spector |
| 4,198,783 A | 4/1980 | Leroux |
| 4,224,756 A | 9/1980 | Loeffler |
| 4,250,666 A | 2/1981 | Rakestraw |
| 4,543,744 A | 10/1985 | Royster |
| 4,597,550 A | 7/1986 | Rice |
| 4,850,135 A | 7/1989 | DeMarco |
| 4,858,381 A | 8/1989 | Walton |
| 5,152,099 A | 10/1992 | Nilssen |
| 5,241,781 A | 9/1993 | Malczyk |
| 5,283,974 A | 2/1994 | Graf |
| 5,315,834 A * | 5/1994 | Garunts et al. .............. 62/78 |
| 5,341,595 A * | 8/1994 | Griggs et al. ............... 47/60 |
| 5,509,946 A * | 4/1996 | Chu ........................ 96/140 |
| 5,833,137 A | 11/1998 | Liao |
| 5,860,289 A | 1/1999 | Wetzel |
| 5,946,853 A | 9/1999 | Jacobs |
| 6,006,471 A * | 12/1999 | Sun ........................... 47/69 |
| 6,197,094 B1 * | 3/2001 | Thofelt ..................... 95/211 |
| 6,360,482 B1 * | 3/2002 | Boyes ..................... 47/62 A |
| 6,536,157 B2 | 3/2003 | Wijbenga |
| 2002/0136669 A1 | 9/2002 | Marques |

FOREIGN PATENT DOCUMENTS

| | | | | |
|---|---|---|---|---|
| JP | 4356138 A * | 12/1992 | | 47/41.01 |
| JP | 06127587 A * | 5/1994 | | 206/423 |

* cited by examiner

*Primary Examiner*—Francis T Palo

(57) ABSTRACT

Sanitizing container and display is a sealed but ventable container for removably placing demonstrable objects such as plants, cut flowers, inside the container, living creatures and the like in hospitals, home or other environments where immunocompromised or allergic patients live. This sealed container and display is provided with a ventilation system that establishes adequate air circulation to the inside the container while clearing the outflow air from any potentially harmful microbes, allergens (small particles that cause allergy) or chemical fumes that would be dangerous for those patients who lack normal immune protection or are allergic. This enclosed chamber can optionally be provided with an artificial light source for illumination of the displayed object if desired.

5 Claims, 4 Drawing Sheets

US 7,644,536 B2

SANITIZING CONTAINER AND DISPLAY

CROSS-REFERENCE TO RELATED APPLICATION

This application is a continuation-in-part of U.S. Ser. No. 10/857,114, filed on Jun. 1, 2004 now abandoned.

FIELD OF INVENTION

The present invention relates to an enclosed apparatus for maintaining and displaying potted plants, cut flowers and flower arrangements in hospitals, home or other environments where immunocompromised or allergic patients live. This sealed plant container and display is provided with a ventilation system that establishes adequate air circulation to the plant while outflow air is filtered to clear any potential harmful microbes, allergens (small particles that cause allergy) or chemical fumes that would be dangerous for those patients who lack normal immune protection or are allergic to plant or flower allergens. This enclosed chamber also is provided with an artificial light source for illumination of the enclosed plants or flowers.

BACKGROUND OF INVENTION

The world-wide rising number of severely immunocompromised patients and those who suffer allergic diseases has made the control and prevention of infections and allergic disorders a critical issue. There are several microbes and allergens in the natural habitat of human, which are not harmful in healthy individual but are potentially dangerous to that patient who lack normal immune protection or suffer from severe allergic disorders, respectively. Opportunistic infections are those infectious agents that could cause infection in those who lack normal immune system. Fungal infections and particularly Aspergillosis, one of important member of this group of infectious agents could cause life-threatening infection among immunosuppressed patients and is thought to be primarily airborne and can be transmitted from fresh cut flower or potted plants. In this regard the Center of Disease Control (CDC) in the United States of America set guidelines for preventing opportunistic infection in transplant wards and those medical floor that admit patients with severely depressed immune system. These guidelines include evidence based recommendations regarding ventilation, plants and all other health related issues to reduce the number and severity of infections in those immunocompromised patients. According to these guidelines, "Experts strongly recommend that plants and dried or fresh flowers not be allowed in hospital rooms of transplant patient or those who are candidate for this procedure. This is because Aspergillus specious have been isolated from soil of potted plants, the surface of dried flower arrangements, and fresh flowers" (Reference to CDC guidelines; Emerging Infectious Disease, by Dykewicz A, Hospital infection control in hematopoietic stem cell transplant recipients, Vol 7, No 2, Mar.-Apr. 2001).

Bringing fresh cut flowers, potted plants or flower arrangement at bedside of an ill person has always been a pleasant tradition and it is not surprising that floral business in or near hospitals is in demand. Bringing flowers and potted plants by visitors for an ill person is not only a symbol of care and concern for the loved one, it also helps the patient to cope better with physical ailment by release of emotional stress and decrease in psychological tensions resulted from closed hospital environment. By creating more natural looking environment for patient who has to spend a lot of his/her time in this closed surroundings, one might be able to decrease the anxiety, fear, depression and other emotional ailment that are associated with physical illness.

Unfortunately, the limitation that mentioned above result in deprivation of many chronically ill patients to enjoy this very privilege and thus, they are not able to keep and enjoy flowers and potted plants in their environments. This limitation applies to both their temporary environment such as hospital and their permanent residence environment such as home or nursing home.

The object of this invention is to create a completely sealed chamber that would separate potted plants, cut flowers or flower arrangements from the surrounding environment and make it possible for immunosuppressed patients or those who suffer sever allergic disorders to enjoy the loveliness of these natural beauties in their living environment. Using an electrical exhaust system and air filter assembly and a check valve, the outgoing air from the container is cleared out of any potential harmful airborne particles including microbes, allergens or fumes that might be harmful to patients and establishing adequate ventilation for the living creature inside the chamber. This closed chamber is made totally or in part from transparent material including glass, acrylic or other artifact that makes it possible to see the inside of the container. Meantime, using mirror, and other decorative artifact could make this display more attractive for hospital environment and/or patients' house.

There are many different types of illuminated containers and the like for containing, displaying and stimulating plant growth. Neither of these devices has been made to satisfy the needs mentioned above, however. The prior art in this field is addressed below. These prior art patents mainly provide a closed environment for displaying or improving plant growth. These include:

1. "Portable Greenhouse" U.S. Pat. No. 6,536,157 by Wijbenga in 2003. This greenhouse is a modular space for plants with plurality of opening in the lid and a ventilating fan that propel air through filter into the greenhouse as forced ventilation. The green house uses filtered ventilation for promotion of plant growth. Although in the first glance this container is similar to "Sanitizing container" because it is a ventilated container for plant display. But, this container is not sealed and the air is forced into the chamber through filters while the exhausted air including plants' germ and allergen could freely enter surrounding environment through lid opening.

2. "Air filtering apparatus and method for using same" Publication No. 20020136669 by Marques in 2002. This is a plant container to be used as an air filter for cleaning the surrounding air in a closed environment. This device uses plant as the air conditioner for closed environment. Obviously, in this container, germs and allergen of the displayed plants could easily enter the surrounding environment.

3. "Air-cleaning ecosystem apparatus" U.S. Pat. No. 6,006,471 by Sun in 1999 is an air-cleaning ecosystem apparatus includes: an ecosystem container having green plants, pollutant-absorbable plants and aromatic plants selectively planted in the ecosystem container with a blower and filters connected to the ecosystem container for delivering input air as primarily filtered into the ecosystem container. In this container the green plants will conduct photosynthesis for absorbing carbon dioxide from the air and giving off oxygen into the air and also the pollutant-absorbable plants will absorb some pollutants existing in the air and add some aroma by aromatic plants to create an outputting clean, fragrant air rich in oxygen beneficial for human and animal breathing for completing a gaseous cycle of ecosystem. In this container, germs and allergen of the displayed plants could easily enter the surrounding environment.

4. "Modular wardian case" U.S. Pat. No. 5,946,853 by Jacobs in 1999 is a multi-section enclosure adapted to support an artificial environment for growing plants. Vertical edges of opaque and transparent wall sections interlock with one another and horizontal edges mount to formed channels at a domed cover and support base. Slide shutters mounted to vent apertures at the divider and cover cooperate with a fan at one of the divider apertures to control internal air circulation and temperature within the growing space. The spaced door and cover vent control make-up and exhaust air flow. This container is not sealed and the exhaust air is not filtered as well.

5. "Open floral display case" U.S. Pat. No. 5,860,289 by Wetzel in 1999 is a refrigerated open display case achieves a laminar flow of chilled air over flowers or produce displayed therein, and establishes a laminar flow boundary layer with the warmer ambient air. This is an open display case and germs and allergen of the displayed plants could easily enter the surrounding environment.

6. "View tank" U.S. Pat. No. 5,833,137 by Liao in 1994 is a display that including an upper section for light to illuminating the middle section that is used for display of plant. The lower section is a water storage section, and water is pumped to a fog generating box for generating fog and a fan for blowing the hot air in the upper and middle sections to the outer rim of the transparent walls of the middle section so as to remove water moisture on the walls. This is not sealed, the fan only blow warm air to clear the moisture from transparent walls and germs and allergen of the displayed plants could easily enter the surrounding environment.

7. "Environmental chamber for plant growth analysis" U.S. Pat. No. 5,341,595 by Griggs in 1994 is an environmental day-lit chamber for plant growth analysis having therein a growth chamber with a perforated or slotted plant supporting floor for allowing air to be forced vertically through the plant space. The transparent and frameless exterior of the chamber shell allows equalized distribution of sunlight with minimal impedance into the growth chamber. A vertical surface at the rear of the plant growth chamber forms a return air plenum for ducting air through the growth chamber and back to an air conditioning compartment beneath the growth chamber for reconditioning the air. A gasket door at the front of the chamber shell provides reach-in capacity for entry into the plant growth chamber and expedites the ability to sealing close the growth chamber upon completion of operations therein. This plant container is designed to perform experiment on plants in out-door but controlled conditions of temperature, gas mixture and humidity. The fan recirculate the air inside the container and an air conditioning device keep the temperature and moisture of the circulating air at determined value. There is no exchange of air with surrounding environment in this closed chamber and thus there is no unidirectional air flow of air filtration device in this chamber.

8. "Room air environment conditioner" U.S. Pat. No. 5,315,834 by Garunts in 1994 is a room air environment conditioner for conditioning and improving the air quality in a room. The apparatus includes an enclosed cabinet containing growing plants on trays filled with water to facilitate sprouting and growing of said plants without dirt or sand. The cabinet is separated into light and dark portions to permit regulated growth of said plants. The trays holding the plants have perforated covers upon which are placed a porous material to hold the seeds and the trays are first placed in the dark portion of the cabinet. Once the seeds sprout with roots they are transferred to the lighted portion of the cabinet to grow and generate oxygen. There is an air ionizer located within the cabinet and also a holder containing various chemicals or powders with curative components. A fan blows air through a wetted filter and the cabinet thus changing the oxygen and ionization content of the air in the room, cooling the air and introducing curative powders into the room. The goal of this invention is to treat the air by introduction of oxygen, absorption of carbon dioxide, ionization, dispersion of useful ingredients and smells of plants into the air, and cooling and increasing the humidity of the air. This container uses a fan and filter to clear the ingressing air into the container. Obviously, in this container, germs and allergen of the displayed plants could easily enter the surrounding environment.

9. "Environmentally controlled display cabinet" U.S. Pat. No. 5,283,974 by Graf in 1994 is an environmentally controlled cabinet that provided for maintaining and displaying plants of various types indoors. A fresh water supply, cooling system and exhaust and ventilation fans are contained in the cabinet, so that the entire system is portable. The cabinet further includes a computerized control system, which is responsive to user input commands for controlling various environmental functions, such as plant watering, temperature, humidity, air circulation and lighting. The ambient conditions within the cabinet are programmable for daytime, nighttime and seasonal cycles. The ambient temperature within the growing chamber can be maintained at a relatively constant level, or alternatively, a temperature differential can be maintained within the growing chamber to accommodate various types of plants which thrive under different temperature conditions. This plant container uses exhaust fan to ventilate the container and maintain the temperature. There is no air filtration in the exhaust fan and the container is not sealed. Thus, germs and allergen of the displayed plants could easily enter the surrounding environment.

10. "House plant hospital" U.S. Pat. No. 5,241,781 by Malczyk, in 1991 which is a house plant hospital comprises a closed container in which a potted plant may be positioned and covered by a hingedly-attached lid. A plurality of lights are mounted within the container, while the plant may be occasionally rotated by being positioned upon a "lazy susan" support. In an alternative embodiment, provision is made for supporting several layers of plants and a water spray system is also provided. Additionally, fertilizer and pesticides may be sprayed over the plants while they are retained within the container. The closed container positionable over the plants operates to retain heat provided by the artificial light source so as to prevent the plants from being damaged in a cold environment. Further, the interior surfaces of the container and its associated lid are completely covered with a reflective mylar material which is unaffected by the liquid spray and which operates to continually reflect the artificial light in all directions so that maximum light availability is provided for the plants.

This container is not sealed and does not have a mean for ventilation and air filtration. Thus, germs and allergen of the displayed plants could easily enter the surrounding environment.

11. "Plant rejuvenator system" U.S. Pat. No. 5,152,099 by Nilssen in 1992 is useful particularly in wintertime. This is a wall-hung shelf that is internally covered with reflective material. Along the rear wall of the shelf, in front of the reflective material, is positioned an array of fluorescent lamps. Within the shelf, in front of the fluorescent lamps, is placed one or more potted plants; each plant positioned on an automatically rotating pot-base. A ventilation fan is arranged to maintain the temperature within the shelf at an optimum level. An automatic watering and feeding arrangement maintains the soil of each potted plant such as to promote effective plant growth. Typically, a plant would be kept in the rejuvenator for a week or so. Thereafter, the plant would be able to maintain a good state of health for perhaps two weeks or so even if kept outside of the rejuvenator in wintertime. This container is not sealed and the fan provides ventilation for control of the temperature. There is no filtration and thus, germs and allergen of the contained plants could easily enter the surrounding environment.

12. "Floral Container and water reservoir" U.S. Pat. No. 4,858,381 by Walton in 1989 is a floral container that has an internal chamber which serves as a fluid reservoir. The chamber is essentially closed to the environment and receive a block of floral foam which is capable of supporting an arrangement of cut flowers. One or more ports are provided to permit facile filling of the chamber with fluid and a wick beneath the level of the fluid causing capillary action transports water along the wick and is preferably impregnated with a floral preservative. This container is not sealed and does not have a mean for ventilation and air filtration. Thus, germs and allergen of the displayed plants could easily enter the surrounding environment.

13. "Apparatus for stimulating plant growth under controlled condition" U.S. Pat. No. 4,850,135 by DeMarco in 1989 is an apparatus for stimulating plant growth under controlled conditions comprises a housing having a lower portion, an upper portion, a hollow interior in which plants are grown and an exterior. Fluorescent lamps mounted within the interior stimulate growth of the plants. The housing is formed with vacuum-metalized walls or panels which, when illuminated by the lamps, reflect a major proportion of light into the interior. The housing is further formed with a lower vent and an upper vent to facilitate circulation of air through the interior. This container is not sealed and there are two vents connect the interior air to surrounding air. There is no filtration and thus, germs and allergen of the contained plants could easily enter the surrounding environment.

14. "Potted plant display stand" U.S. Pat. No. 4,597,550 by Rice in 1986 is a potted plant display stand for displaying a small potted plant at angles, varying from 20 to 70 degrees, to the horizontal, for fuller viewing by a bed-ridden patient. The base of the stand is a hollow, dome-like shell, circular in shape, for placing the stand securely on a horizontal surface. This container is not sealed and does not have a mean for ventilation and air filtration. Thus, germs and allergen of the displayed plants could easily enter the surrounding environment.

15. "Plant growing chamber" U.S. Pat. No. 4,543,744 by Royster in 1985 is a growing chamber defined by sidewalls and a top spanning the chamber inside the walls. The top is mounted to be vertically moveable to change the chamber height. The walls and top are coated to be ninety percent reflective. A horticultural lamp is mounted on the top and a timer turns it on and off. Carbon dioxide gas is supplied to the chamber the gas being controlled to be supplied intermittently, but only while the lamp is on. Although this container is sealed, this means is used to control the gas mixture with in the chamber for better plant growth and obviously the exhaust air is not filtered. Thus, germs and allergen of the displayed plants could easily enter the surrounding.

16. "Supporting structure for plants" U.S. Pat. No. 4,250,666 by Rakestraw in 1981 is a device for supporting plants for decorative or gardening purposes. A plurality of rotatable or fixed trays or shelves are mounted on a central support, and shelves can optionally be added on the sides of the device, such as adjustable shelves for potted plants. This container is not sealed and does not have a mean for ventilation and air filtration. Thus, germs and allergen of the displayed plants could easily enter the surrounding environment.

17. "Hydroponic apparatus" U.S. Pat. No. 4,198,783 by Leroux in 1980 is an enclosed hydroponic apparatus comprising a free standing reinforced base housing a nutrient feed supply including a temperature control device to partially control the temperature within the hydroponic apparatus, a plant enclosure including a frame to support a plurality of partitions attached to the upper portion of the free standing reinforced base and a plurality of frosted, convex light absorbing elements mounted on the upper portion of the frame to intercept and direct light to the plants disposed within the plant enclosure. This container is not sealed and does not have a mean for ventilation and air filtration. Thus, germs and allergen of the displayed plants could easily enter the surrounding environment.

18. "Inflatable Terrarium assembly with controlled environment" U.S. Pat. No. 4,128,966 by Spector in 1978 is a collapsible terrarium assembly which is inflatable to assume a desired configuration for protectively housing a plant or other organic material in a controlled environment adapted to promote plant growth or to stimulate organic activity. The structure is constituted by a disc-like base and a replaceable dome attachable thereto by means of a coupling ring. The dome is formed by a flexible plastic envelope whose rim is provided with an annular skirt that is interposed between the coupling ring and the base to define a hermetically-sealed enclosure. The envelope is provided with a two-way valve, which in one position makes it possible to exhaust the air from the enclosure, and in another position to inflate the dome with an inert gas to create a controlled environment. This is a sealed container that provides exposure of the contained material to specific gases (nitrogen, carbon dioxide, ethylene). It does not have a means for ventilation to preserve a living plant or air filtration to clear the exhaust from germs and allergens.

19. "Portable greenhouse" U.S. Pat. No. 4,051,626 by Trumley in 1977 is a portable, self-contained greenhouse includes a base pan having longitudinally extending troughs adjacent the sides there of and a curved bottom panel. A transparent enclosure including a plurality of slidable, transparent wall and roof panels is supported on the base pan. An automatic heating arrangement is disposed partially within the base pan for uniformly heating the soil mixture contained therein. Artificial lights and a control system are included for selectively, artificially stimulating the plants as a function of ambient lighting conditions. A moisture indicator is also provided. This container is not sealed and does not have a mean for ventilation and air filtration. Thus, germs and allergen of the displayed plants could easily enter the surrounding environment.

20. "Flower caddy" U.S. Pat. No. 3,973,356 by Schacht in 1993 is a caddy providing a protective enclosure for the delivery and display of house plants and cut flowers. The caddy includes a receptacle and interfitting cover. The cover is telescopically slidable over the receptacle and the height is adjustable for accommodating a range of flower sizes and stem lengths. The cover is securable at incremental heights by the cooperative action of a harness attached within the receptacle and extendible through selected registration slots in the receptacle for engagement with the cover. The harness further provides a carrying support for the caddy. The receptacle is also functional as a display vase. This container is not sealed and does not have a mean for ventilation and air filtration. Thus, germs and allergen of the displayed plants could easily enter the surrounding environment.

21. "Environmental Chamber" U.S. Pat. No. 3,746,080 by Mallory in 1973 is an environmental chamber wherein conditions of temperature, humidity, and daylight are simulated to most nearly approximate conditions found in nature. The chamber uses an Xenon lamp as a light source to closely simulate natural sunlight. Within the chamber, light from the Xenon lamp is changeably filtered so as to produce light conditions that nearly approximate the varying sun conditions which exist throughout a typical normal day at a particular location. Temperature and humidity are controlled by air conditioning and heating systems that are programmed to produce atmospheric conditions within the chamber in simulation of actual environmental conditions. air conditioning means having means for heating the circulated air, means for cooling the circulated air, and means for adding moisture to the air. This container is not sealed and does not have a mean for air filtration. Thus, germs and allergen of the displayed plants can easily enter the surrounding environment.

22. "Controlled environment apparatus and process for plant husbandry" U.S. Pat. No. 3,673,733 by Allen in 1972 is a controlled environment chamber for plant husbandry that is provided with a readily removable sealing top having therein separately sealed light source chamber containing incandescent and fluorescent lights. A control chamber is adjacent to the growing chamber and covered by the top for containing therein a fluid and electrical control circuit for energizing the lights in a timed cycle, individually manually controlling the lights, providing for the introduction of pressurized carbon dioxide into a control volume and simultaneously venting the growing chamber to the outside environment air when the lights are de-energized, discharging the carbon dioxide from the control volume into the growing chamber and simultaneously closing the vent when the lights are energized, and thermostatically controlling only the incandescent light for controlling the temperature within the growing chamber. The fresh air vent valve is spring closed and opened by means of an expansible chamber directly connected to the carbon dioxide control volume. The mixture of carbon dioxide within the growing chamber is controlled by means of a pressure regulator, and a pressure gauge determining the pressure within the control volume and indicating parts of carbon dioxide within the control volume per million parts of gas within the growing chamber. A motor drives one fan to provide circulation within the growing chamber, and another fan to circulate cooling air through the control chamber, light source chamber and through the open vent. This is a sealed container that provides exposure of the contained plants to specific gas mixture. The ventilating fan can change the air within the container without air filtration. Thus, germs and allergen of the displayed plants can easily enter the surrounding environment.

23. "Cultivation receptacle" U.S. Pat. No. 3,667,158 by Privett in 1972 is a combined humidifier and plant apparatus for humidifying the atmosphere and for growing and/or displaying of plants. For the growing of plants, a tray provided in the cabinet supports a layer of soil. The soil is moisturized by a water absorbent material that is partly immersed in a water trough. The humidifying means includes a fan mounted in the cabinet that drives air and water vapor out through an outlet to humidify the atmosphere. This container is not sealed and does not have a mean for air filtration. Thus, germs and allergen of the displayed plants could easily enter the surrounding environment.

SUMMARY OF THE INVENTION

The present invention is a further improvement in containers and displays that make it possible to maintain and display potted plants, cut flowers or flower arrangements in indwelling environment of immunosuppressed patients or those with sever allergic disease without exposing them to dangerous airborne microbes, allergens or fumes that are associated with these living creatures.

The present invention comprises a closed transparent container in which a potted plant, cut flower or flower arrangement may be removably positioned. The walls of the container are made of a transparent material such as glass or acrylic. This makes it possible to see the enclosed potted plants, cut flowers or flower arrangement that are positioned inside of the container through removable lid. The container can have any three-dimensional shape including but not limited to hexagonal prism, octagonal prism, triangular prism, cube, rectangular prism, cylinder, dome, sphere, cone, pyramid, diamond, mixed cone & cylinder, curved cylinder or mixture of these shapes. The container can be illuminate by an external light source.

The sealed container is provided with controlled air flow to isolate the contents from its surroundings. The container has a ventilation mean that permits the exchange of air between container inside and surrounding environment. This ventilation means comprises of an electrical exhaust system that propels the air out of the container through an air outlet passageway and passes it through an air filter assembly downstream of the exhaust system to the surroundings. The air filter assembly traps any possible airborne particles including fungal spores, microbes, allergens, chemical fumes and other small particles from the out going air. The air could only enter the container through an inlet passage way that is controlled by a one way valve.

DETAILED DESCRIPTION OF PREFERRED EMBODIMENTS

Figure 1:
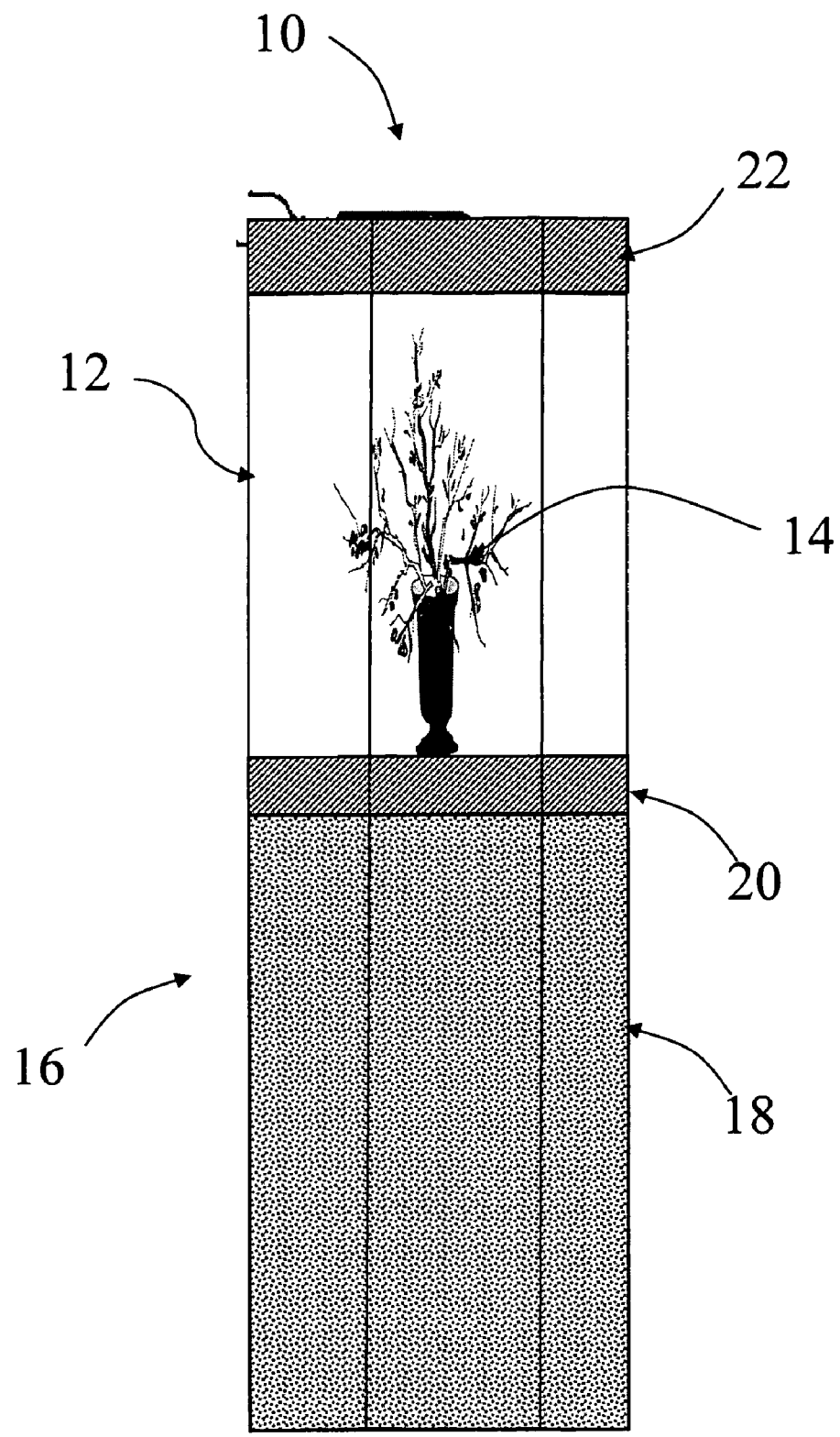
FIG. 1 is a perspective view of housing of the present sanitizing container and display. This figure shows a hexagonal prism format of the housing.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As it is depicted in FIG. 1, Sanitizing Container 10 includes a sealed container with transparent walls 12, which can be placed on a furniture stand 16. The container embodiment could be made from any transparent material and in any possible three dimensional shape including but not limited to hexagonal prism, cube, Rectangular prism, cylinder, dome, triangular prism, sphere, pyramid, cone, diamond, octagonal prism, mixed conical and cylindrical, curved cylindrical or mixture of these shapes. Depending on its shape, the transparent container has one or more transparent walls or windows. The housing has a removable lid 22 or window 30 (FIG. 2) which permits access to housing interior in order to place or position potted plants 14, cut flowers, vases, or flower arrangements. When the removable lid is closed, the container is sealed. The plant 14 can be placed on a display platform 20 which, together with the support 18, comprises the furniture stand 16.

Figure 2:
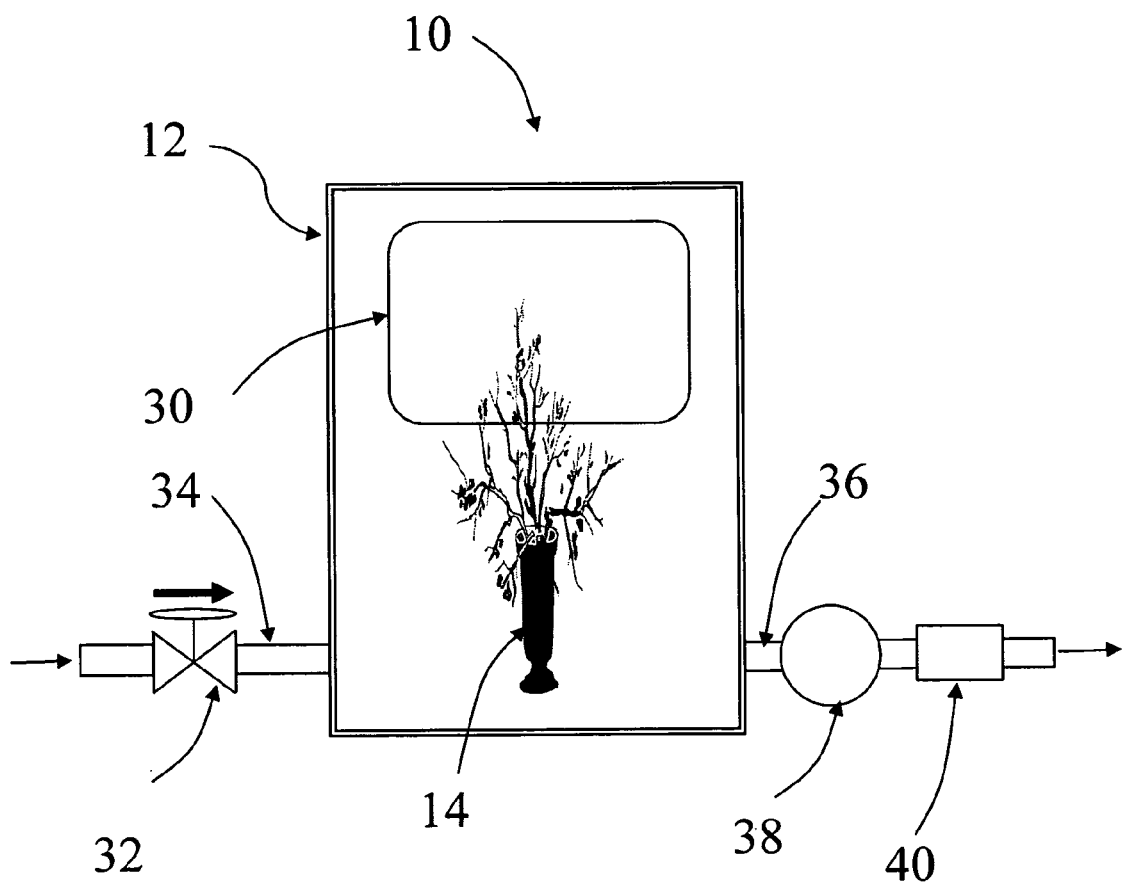
FIG. 2 is a schematic view of the container and its ventilation system connections.
Figure 3:
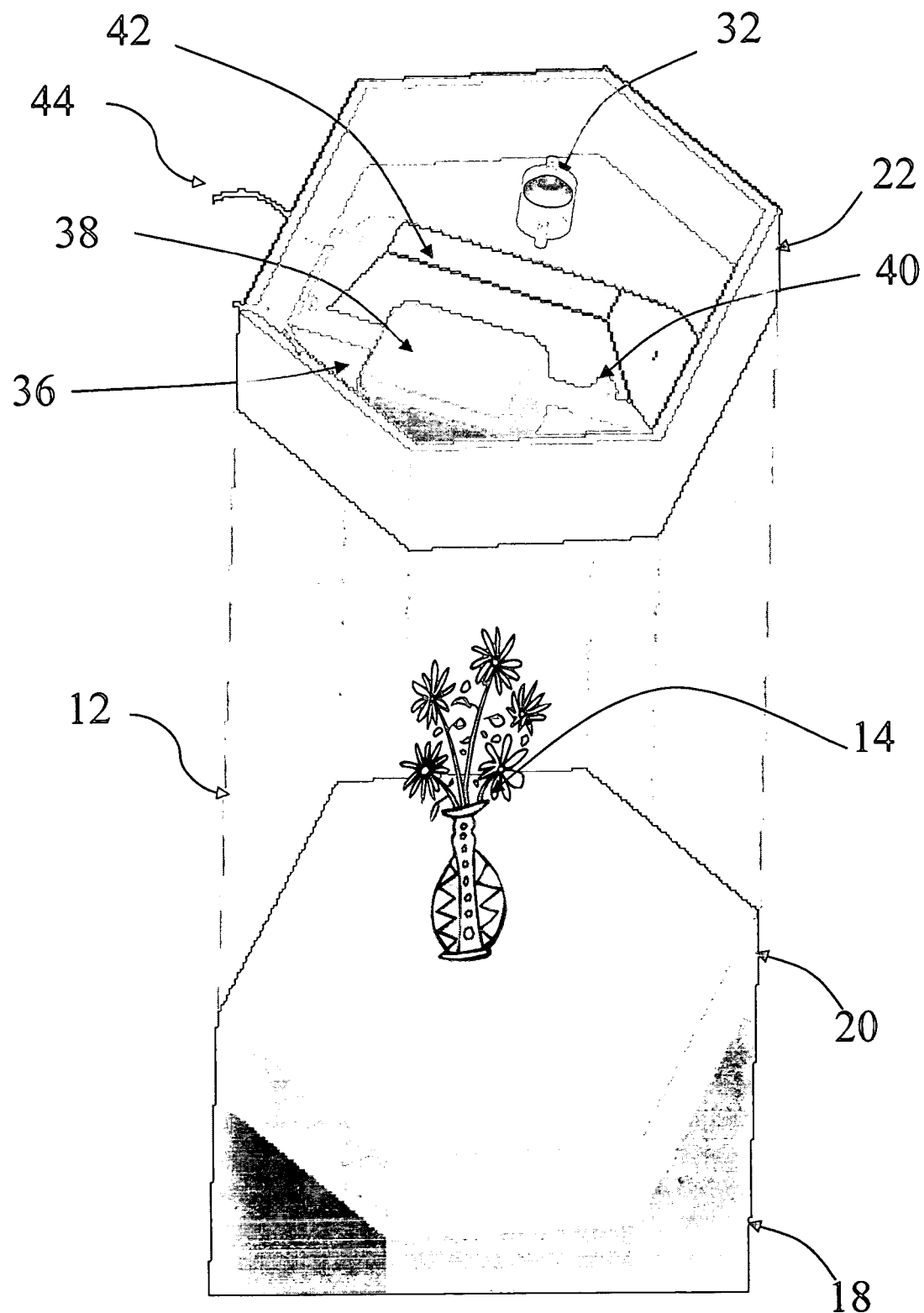
FIG. 3 is a perspective view of another embodiment of the sanitizing container and display with top cover removed to show interior detail.
Figure 4:
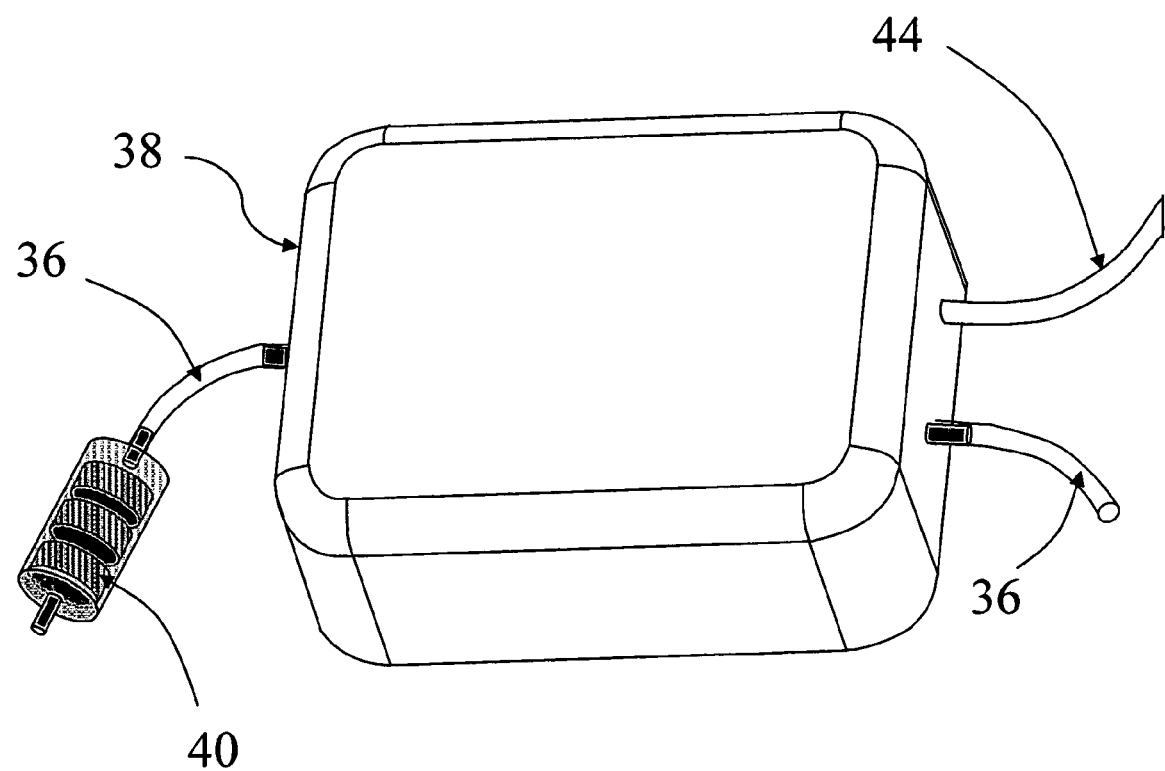
FIG. 4 is an enlarged perspective view of exhaust assembly that ventilates the housing shown in FIG. 3.

As shown in FIG. 2, the container 12 has ventilation that permits air exchange between, the interior of the container and surrounding environment through an exhaust system such as an exhaust device, e.g., pump 38 and a filter assembly 40. For example, the air can only enter the interior of the container through an air inlet passageway 34 that is provided with a unidirectional valve 32. The air can only exit from the interior of the container through air outlet passageway 38. The air moves because of the negative pressure created by exhaust system 38. The air that leaves the exhaust system passes through an air filter assembly 40 (FIGS. 3 and 4) before it is discharged into surrounding environment. The filter assembly 40 clears the germs and allergens from the out going air. The container can be illuminated, if desired, using a lighting assembly 42 which, together with the described exhaust system, is connected to a power source via electrical cord 44.

The foregoing description and the drawings are illustrative of the present invention and are not to be taken as limiting. Still other variations and rearrangements of parts are possible without departing from the spirit and scope of this invention.

I claim:

1. Sealed but ventable container which comprises
   an air inlet passageway communicating with the container;
   a one-way valve in the said air inlet passageway permitting air ingress into the container in response to a reduced pressure within the container;
   an air outlet passageway communicating with the container;
   an exhaust device operably mounted in the air outlet passageway; and
   an air filter in the air outlet passageway situated downstream from said exhaust device.

2. Sealed container according to claim 1, wherein the walls are made from transparent material.

3. Sealed container according to claim 1, wherein the said container has a lid or window for removably positioning an object inside the container.

4. Sealed container according to claim 1, wherein the interior of said container is illuminated by a lighting assembly.

5. Sealed container according to claim 1, wherein the said container is supported on a decorative stand.

\* \* \* \* \*